May 23, 1967
D. L. SNOW ETAL
3,321,223
CABINET CONSTRUCTION
Filed Nov. 30, 1964
2 Sheets-Sheet 1
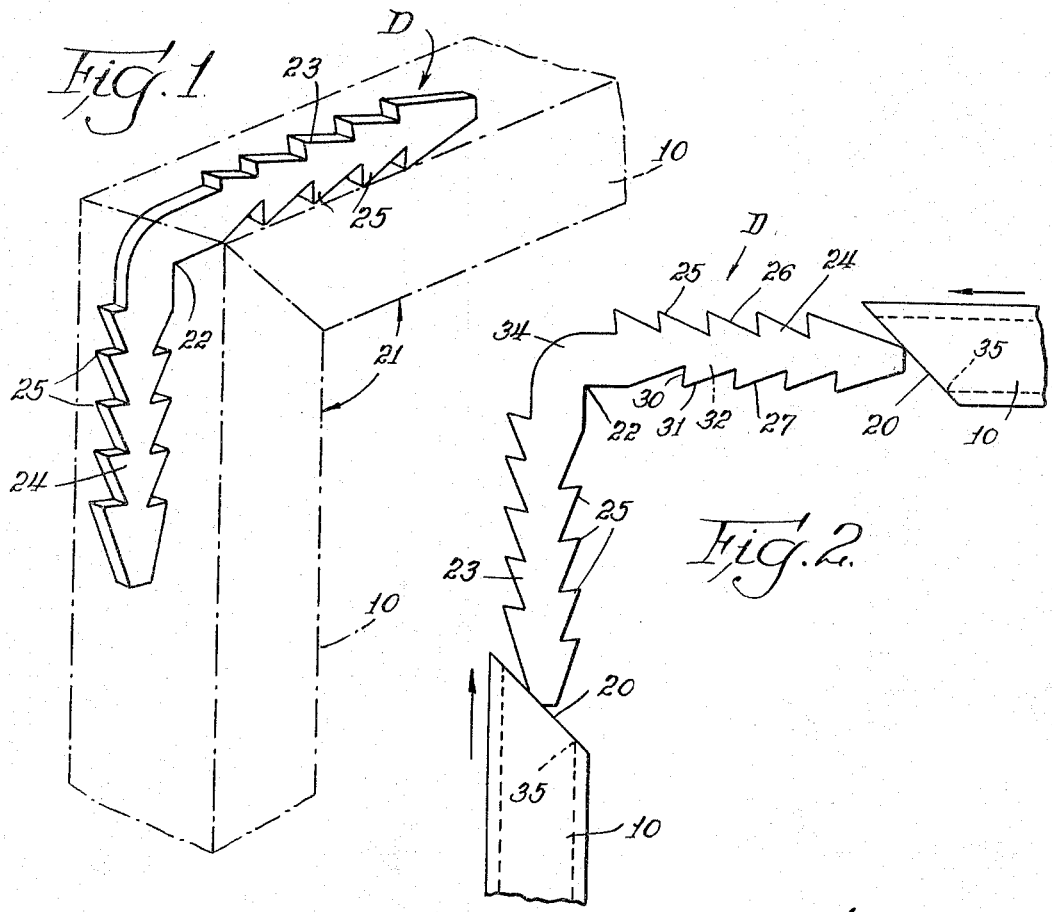
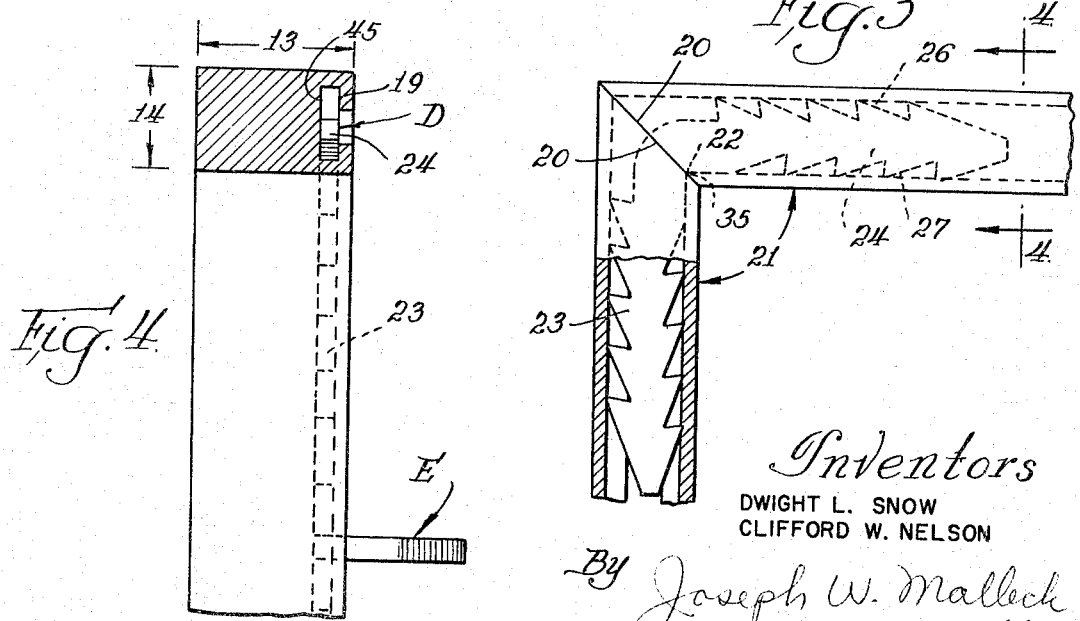
Inventors
DWIGHT L. SNOW
CLIFFORD W. NELSON
By Joseph W. Malleck
Att'y.

May 23, 1967
D. L. SNOW ET AL
3,321,223
CABINET CONSTRUCTION
Filed Nov. 30, 1964
2 Sheets-Sheet 2
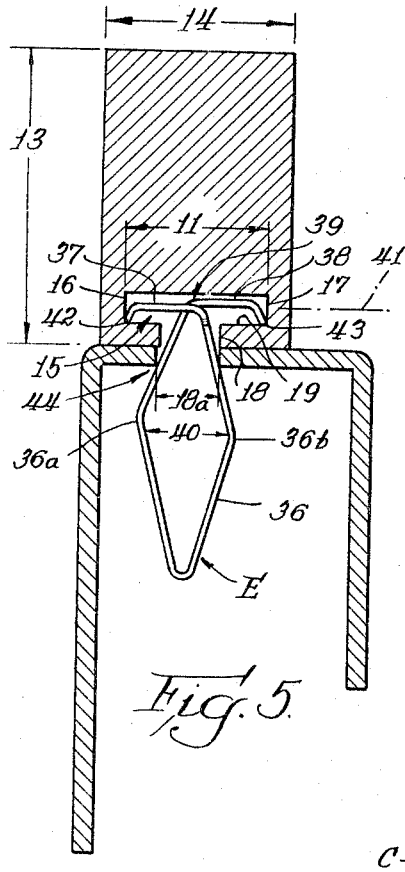
Fig. 5.
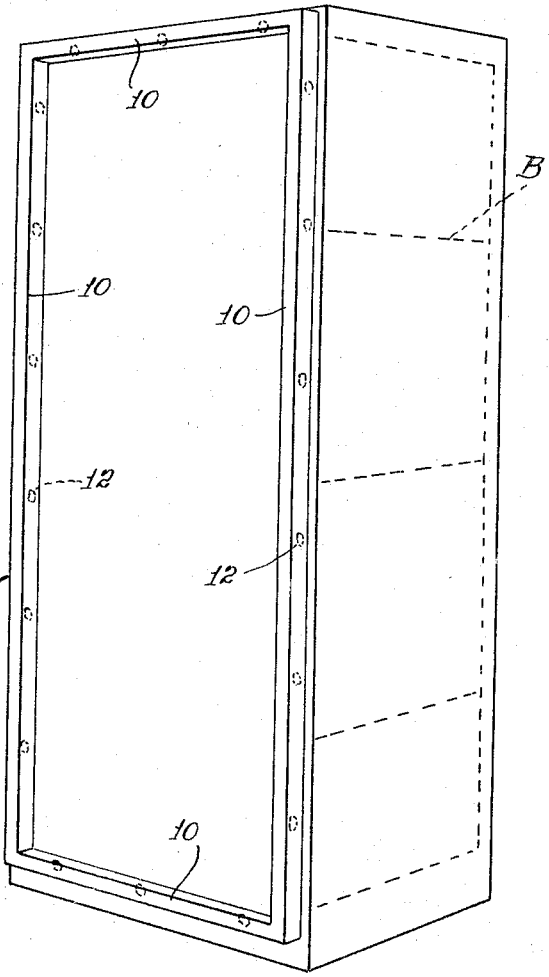
Fig. 8.
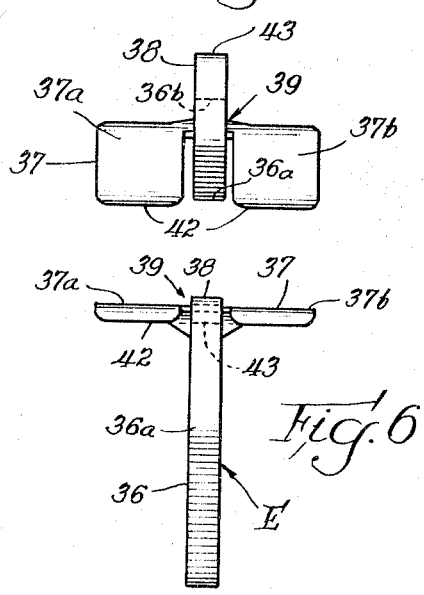
Fig. 7.
Fig. 6.
Inventors
DWIGHT L. SNOW
CLIFFORD W. NELSON
By Joseph W. Malleck
Att'y.

United States Patent Office 3,321,223
Patented May 23, 1967

3,321,223
CABINET CONSTRUCTION
Dwight L. Snow, Homewood, and Clifford W. Nelson, South Holland, Ill., assignors to Borg-Warner Corporation, Chicago, Ill., a corporation of Illinois
Filed Nov. 30, 1964, Ser. No. 414,766
1 Claim. (Cl. 287—189.36)

This invention relates to interlocking mechanisms and more particularly to interlocking mechanisms for securing together angularly disposed elements formed of hollow extruded metal.

A primary object of this invention is to provide means whereby decorative trim work, which may typically be formed of extruded aluminum, is applied to the faces of cabinet constructions, such as those employed for housing electronic equipment, with extreme ease and without fear that the members will be improperly inter-related and insecure.

Another object of this invention is to provide a unitary bracket member carrying a plurality of teeth or serrations on opposite legs thereof effective to be simply and easily inserted into the interior receptacles formed in elongated trim work channels, whereby said channels will be related together in a predetermined angular manner and locked as an assemblage.

Still another object of this invention is to provide an economical means for joining mitered corners of extruded trim work normally employed upon the facing of metallic cabinet constructions, said locking device being particularly characterized in that it is totally hidden when fully placed in a locked condition and that it is effective to bring together elongated members having a hollow interior.

Yet another object of this invention is to provide an interlocking mechanism effective to join together in an angular disposition hollow channels normally employed as trim work for electronic cabinet constructions, said assembled trim work having structure capable of permitting simplified mounting upon a cabinet having sheet metal walls, said structure being particularly characterized by resilient clips.

Other objects and advantages of this invention will become apparent from the following detailed description taken in connection with the accompanying drawings in which:

FIGURE 1 is a fragmentary perspective view of a portion of a cabinet enclosure having trim work applied thereto, said cabinet construction trim work being shown in schematic outline and employing unique elements of this invention as shown in full line;

FIGURE 2 is an elevational view of a fragmentary portion of decorative trim elements shown in the pre-assembled condition joined together;

FIGURE 3 is a view like that in FIGURE 2 showing the elements in the fully assembled condition and illustrating certain portions in section;

FIGURE 4 is a sectional view taken substantially along line 4—4 of FIGURE 3;

FIGURE 5 is an enlarged sectional view taken substantially along line 5—5 of FIGURE 8;

FIGURE 6 is a side view of the resilient clip shown in FIGURE 5;

FIGURE 7 is a top view of the clip shown in FIGURE 5; and

FIGURE 8 is a general elevational view of a cabinet construction having the trim assembled according to this invention.

Turning now to the drawings, there is shown in FIGURE 8 a cabinet enclosure A having a super-structure B and employing decorative trim structure C comprising a plurality of interconnected elongated elements 10 each adjacent elements being held together by a unitary locking member D and the assembled trim work being mounted upon the enclosure by a plurality of resilient clips E.

In more particularity, the cabinet super-structure comprises preferably sheet metal struts joined together by welding or bolts and upon which is hung cabinet body A formed of sheet metal panels and each panel given a characteristic form according to its special purpose. The periphery of the front face of the cabinet enclosure A has a plurality of openings 12 defined therein in predetermined spaced relation effective to receive the resilient clips E extending thereinto in a locking manner as will be described.

The trim structure C is comprised of elongated aluminum elements 10 each having an extruded cross-sectional configuration as shown in FIGURE 4 wherein the transverse extent 13 is greater than the width 14; an elongated channel is formed within the elements and is defined by a rectangular space extending throughout the entire elongated extent of each element 10 and has opposite sidewalls 16 and 17 spaced apart a predetermined distance 11. A slot 18 is provided in wall 19 communicating the exterior of the element 10 with the space 15 and has a lateral width 18a effective to permit the neck of the resilient means E to extend therethrough in a locking manner as will be described. At least one end of each element 10 is provided with a mitered end face 20 effective to mate with and contact fully with end face 20 of another or adjacent element 10 when brought together by the locking element D. The end faces 19 are formed so that the elements 10 are brought together, an included angle 21 is defined; each element is accurately positioned to a proper degree relative to the locking element D by stop means 22 as will be described.

The unitary locking member D has a plurality of legs, here being 23 and 24, each leg having serrations 25 defined on opposite sides 26 and 37 thereof. The member D is formed from conventional metal bar stock having a rectangular cross-sectional shape, the greatest lateral extent 28 is adapted to lie, when interlocked, along the distance 11 of the space of the channels. Each of the serrations 25 are comprised of a plurality of teeth each having sides 30 and 31 with a mean line 32 disposed in a direction slanted toward the apex 34 of the locking member D. The angle between the legs 23 and 24 is predetermined to be equal to that of the desired angle 21 between the elements 10 when fully assembled.

Stop means 22 is defined on each locking member by a sharp corner effective to engage the edge 35 of the end face of an element and thereby automatically gauging the depth to which the element should be forced over a leg of the member D.

The mounting clips E each comprise a body 36 of resilient metal preferably stamped from a strip; the body 36 is preformed to define a loop having terminal end portions 37 and 38 converging at a point 39. Sides of the body are given a slight indentation at intermediate portions 36a and 36b to define a specific transverse width 40 and thereby provide a predetermined flexibility to pass through the narrow openings in the cabinet and expand for locking in place. At intersection 39, terminal portion 37 is divided (see FIGURE 7) into ears 37a and 37b so that the other terminal portion 38 may pass and overlap; each of the terminal portions 37 and 38 are bent in a manner so as to lie in a common plane 41 commensurate with space 15 (see FIGURE 5). The tip 42 and 43 of each respective terminal portion is turned inwardly in a direction to bear against a transverse wall 17 of interior space 15 within the trim work or preferably at the corner of the interior space 15.

The clips E are of such construction that they are capable of being inserted through the slot 18 of the elements 10; by spreading the loop to retract the terminal end portions toward each other; the slips may then be introduced by tilting and inserting them into the channel of the element 10 at any position therealong before or after the elements are assembled in the continuous manner as provided by the locking members D. With the clips E assembled within the unassembled element 10, the terminal portions 37 and 38 snugly occupy the interior space 15 providing a very stable mounting with the neck 44 of each clip extending outwardly through the slot 18 thereof. Next, the elements 10 are assembled together in a preselected manner by utilizing the locking members D whereby they are interfitted with the serrations forced against the interior walls 16 and 17 of space 15. Each element 10 is moved relative to a leg of the locking member D in a direction so that the slant of the teeth (as indicated by the mean line 32) causes an interference fit between the walls 45 and 18 and the outer extremities of the teeth. The first element 10 assembled with the locking member is pushed onwardly to a degree whereby the inner lip 35 is brought into contact with the sharply defined corner 22 of the locking member thus providing accurate positioning. Subsequently other elements 10 are brought in a proper flush face-to-face relationship with the already mounted element 10 on the locking member D.

With the trim structure C provided with mounting clips E and interlocked with the members D, the assembly is then placed against the sheet metal panels of the cabinet construction with the clips aligned with the spaced openings 12 therein and resiliently forced therethrough. The lateral width 40 of each of the clips is effective to be flexed sufficiently so that they may be passed through the openings of the sheet metal panels and expand upon reaching the other side securing the trim structure as shown in FIGURE 5.

We wish it to be understood that our invention is not to be limited to the specific construction and arrangement shown and described, as it will be apparent to those skilled in the art that changes may be made without departing from the principles of the invention.

We claim:

A cabinet construction comprising the combination of two elements having mitered end surfaces adapted to be placed in complemental engagement having interior walls defining rectangular interconnecting receptacles when the elements are placed in engagement with each other, and a locking member of harder and more resilient material than said elements with thin and flexible resilient leg portions respectively adapted to extend within the receptacles of the elements in a manner substantially parallel with the respective general axes of the receptacles thereof, said leg extensions having a plurality of teeth serrations formed on opposite sides thereof having a mean line extending in a direction towards an apex from which said legs extend, and with the included width between the outer extremities of opposite serrations being slightly greater than the sides between said opposite interior walls of the respective receptacles to interfere with the opposite interior walls of said receptacles to maintain a locked assemblage of said combination, said oppositely positioned teeth of each of said leg extensions being staggered with respect to said teeth of the opposite sides thereof, whereby the pressure exerted by said locking member against the interior walls of said receptacles tends to alternately deflect the resilient body portion of each of said leg extensions to increase the resilient locking pressure of each of said leg extensions.

References Cited by the Examiner

UNITED STATES PATENTS

| | | | |
|---|---|---|---|
| 2,101,349 | 12/1937 | Sharp | 287—189.37 |
| 2,197,419 | 4/1940 | Ross | 52—511 |
| 2,989,788 | 6/1961 | Kessler | 287—36 |
| 3,077,251 | 2/1963 | Fraylick et al. | 52—718 |
| 3,107,759 | 10/1963 | Day et al. | 52—718 X |

FOREIGN PATENTS 570,357 8/1958 Belgium.

References Cited by the Applicant

UNITED STATES PATENTS

| | | |
|---|---|---|
| 2,295,893 | 9/1942 | Detrich. |
| 2,343,525 | 3/1944 | Blodgett. |
| 2,464,470 | 3/1949 | Vanderveld. |
| 2,482,174 | 9/1949 | Hake. |
| 2,489,493 | 11/1949 | Kuenzie. |

REINALDO P. MACHADO, *Primary Examiner.*

CHARLES E. O'CONNELL, *Examiner.*

J. K. BELL, *Assistant Examiner.*